United States Patent Office 3,250,070
Patented May 10, 1966

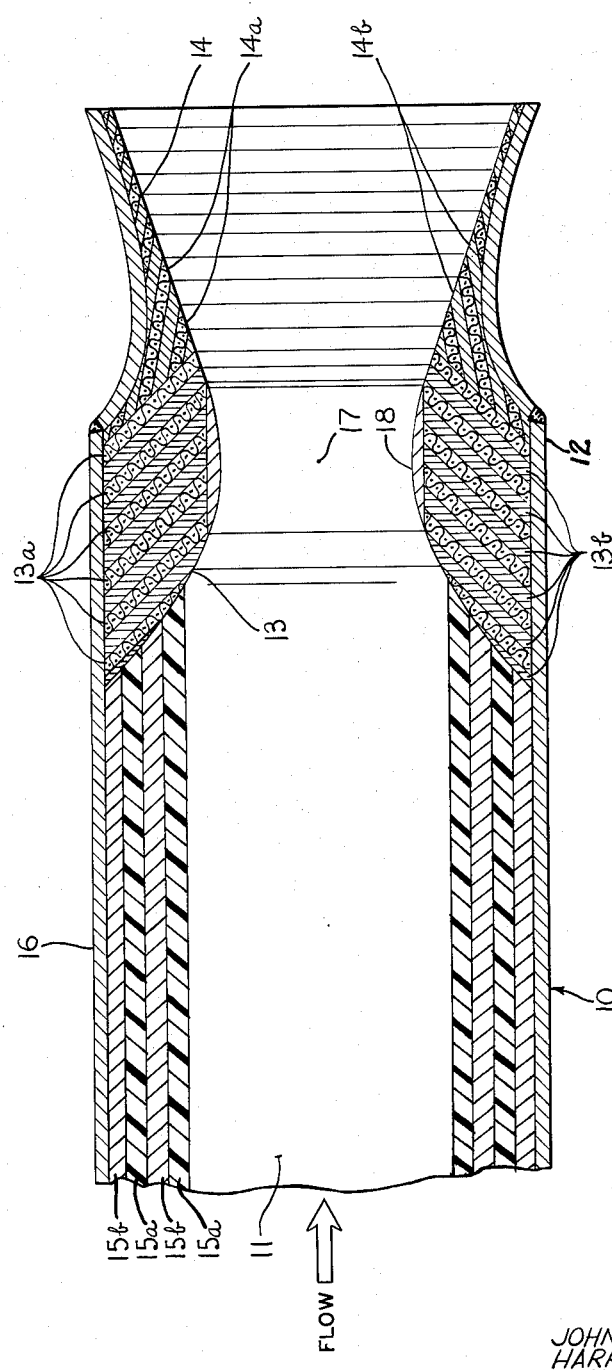

3,250,070
ROCKET MOTOR
John V. Milewski, Saddle Brook, Harry S. Katz, West Orange, and John R. Crothamel, Denville, N.J., assignors to Thiokol Chemical Corporation, Bristol, Pa., a corporation of Delaware
Filed Oct. 1, 1962, Ser. No. 227,408
6 Claims. (Cl. 60—35.6)

This invention relates to rocket motors and their construction. In particular it relates to rocket motors which must withstand extreme temperatures and operate with no external cooling. Temperatures to which these rocket motors are subject usually range from about 1000° F. to above 5000° F., and operate for periods ranging from less than one-second to several minutes. These rocket motors have their widest application in the small, control rocket field although application to large, booster type motors is also contemplated. In addition, the invention is useful in either solid or liquid propellant motors.

In prior art rocket motors of the uncooled type, the walls thereof are usually constructed of high temperature resisting materials applied to the inner portions of an outer, usually metallic, shell. In the usual practice materials selected for this purpose include graphite, ceramic, porous metal, certain resinous compounds and the like. Various methods of attaching these materials to the shell interior are used, most usually by means of adhesives or by force or press fitting techniques. Such motors, however, are disadvantageously heavy, and as a consequence their use is confined to earth bound applications and test vehicles where the weight of the motor is of small importance.

It is accordingly an object of the present invention to provide a rocket motor of the uncooled type wherein the walls thereof are constructed of light weight, high strength materials and are suitable for use over prolonged periods and at high temperature. It is another object of the invention to provide a rocket motor of the uncooled type which is capable of withstanding repeated firings.

A still further object of the invention is to provide a rocket motor construction having interior walls comprised of layers of alternately arranged heat conductive and heat insulative materials, wherein much of the heat developed by combustion of propellants in the motor chamber is distributed through the layers to permit long term operation of the motor. Still another object of the invention is to provide a rocket motor liner suitable for use in high temperature applications and which is capable of withstanding said high temperatures for long periods.

Still other objects will become apparent from the detailed description which hereinafter follows. It should be understood, however, that the detailed description and/or specific examples set forth are indicative of preferred embodiments thereof, and are given by way of illustration only, since various changes and modifications within the spirit and scope of the invention will become apparent to those skilled in the art to which the invention pertains.

As will be seen in what follows, the invention is embodied in rocket motor walls and/or liners thereof, hot gas tubes, ducts and like devices wherein high temperature gas flowing at high velocities must be contained and withstood before it can be used safely and beneficently.

The single figure of the drawing is a section view of a rocket motor 10 which includes a chamber section 11, and a nozzle section 12 having the usual convergent portion 13 and divergent portion 14 surrounded by outer shell 16. Refering to chamber section 11, there is shown a chamber liner 15 having alternately arranged layers 15a and 15b disposed about the central motor axis in a substantially concentric fashion. As will be hereinafter described, layers 15a and 15b are comprised of particular materials arranged as shown and are in large part the subject of the invention. In nozzle section 12, specifically in converging portion liner 13, the layers 13a and 13b are again alternately arranged and are comprised of particular materials to be later described. In this instance, however, the disposition of the layers is such that their edges are substantially facing into the gas stream in the motor. This is accomplished by means of forming each layer into a frustro-conical shape and nesting them to the angle formed by the slope of the frusto-conical layer as shown. It is also preferable in nesting the layers, that the angle formed by the slope of the frusto-conical layer and the axis of the motor be less than 90° to minimize any tendency for the layers to separate or "delaminate." After assembling the layers, as will hereinafter be explained, the contour or convergence of converging liner portion 13 in nozzle 12 can be formed.

In the region of minimum diameter of nozzle 12 is throat 17. Diverging liner portion 14 begins thereat and extends to the end of the motor. As before, the alternate arrangement of layers or laminates 14a and 14b is maintained and also for reasons set forth later herein are comprised of particular materials, and disposed therein in the manner shown.

Basically, the invention herein contemplates a rocket motor construction comprised of layers of alternately arranged heat insulative and heat conductive materials wherein heat generated by combusting propellants in the chamber 11 is safely confined by and/or conducted throughout the laminated liner 15. The manner in which this is accomplished is described in copending application to John Milewski and Harry S. Katz, Serial No. 99,908 and filed March 31, 1961 under the title "Composite Heat Shield." The invention is further concerned with arranging the layers in the various sections of the motor in a manner to best bring about a high degree of heat transfer throughout the motor walls and/or liner, thereby resulting in a unique, lightweight motor capable of operating for prolonged periods at high temperatures.

In constructing the invention, motor 10, which includes an outer shell 16, a chamber section 11 and a nozzle section 12 with a converging portion 13 and a diverging portion 14, is formed into a laminated article as shown. Thus in chamber section 11 there is a liner 15 fabricated by forming concentric cylindrical layers 15a of heat insulating materials in alternate arrangement with other cylindrical layers 15b of heat conducting material. Material preferred for use in layers 15a is an insulative plastic compound comprised of an epoxy novalac thermosetting resin of excellent high temperature quality.

The insulative quality of layers 15a is enhanced and its weight decreased by the addition thereto of many inert glass or plastic, miniature (5 to 90 microns diameter) spheres such as for example those available under the trademark Microballoons of the Standard Oil Company of Ohio, and fully set forth in copending application to J. Milewski et al., Serial No. 99,908, filing date March 31, 1961, above-mentioned. Addition of these "microspheres," which can be hollow and are usually supplied in that form by the various manufacturers, is accomplished by dispersing them more or less homogenously through the epoxy resin prior to curing.

The material for the conductive layers 15b is usually in the form of a thin sheet, foil or screen of a metal such as copper, steel, aluminum or nickel.

In the nozzle section 12, which comprises converging liner portion 13, diverging liner portion 14 and throat 17 therebetween, the alternating layer arrangement as in chamber section 11 is maintained. Layers 13a and 13b are alternately heat insulating and heat conducting and are positioned so as to present their edges to the hot gases which, due to nozzle convergence, are increasing in velocity. Heat transfer at this portion is therefore increased and more heat is absorbed by the layers due to their angularity with respect to the motor axis. This layer disposition also permits further increase in overall linear thickness at this portion without significant increase in weight and its ability to absorb more heat is readily apparent.

Materials selected for liner portion 13 are selected for their heat insulative and heat conductive quality in accordance with the higher heat absorption rate (and therefore higher temperature levels). Thus a high temperature resisting silica fiber such as that sold under the H. I. Thompson Fiber Glass Company trademark Refrasil has been found to be very satisfactory. This material lends itself quite well to this particular application because of its ability to withstand very high temperatures. For the conductive layer, tungsten in thin sheet or screen form is used because of its high temperature resisting, yet heat conductive, qualities. Other materials useful for this layer include thin sheets, or screens of molybdenum, and where the temperature environment permits, some of the more highly conductive materials such as aluminum, copper, nickel and steel either in plate, sheet, foil or screen form are usable.

In like manner the diverging portion liner 14 is fashioned in that the pattern of an alternate layer structure is maintained, i.e., layers 14a and 14b are comprised of heat insulative and heat conductive materials. The materials in layers 14a (insulative) are identical or at least similar to their counterparts in liner portion 13. However, the conductive layer is preferably comprised of carbon cloth or screen, although metallic materials as in the previous liner portion 14 are also quite usable.

In the nozzle section 12, especially the converging portion liner 13, wear resistance and greater heat resistance is required because as is well known, heat transfer and gas velocity rises sharply becoming a maximum at throat 17. Therefore the layers are placed angularly with respect to the motor axis so as to present an approximately edge-on relationship to the exiting gases as heretofore stated. Materials used here are preferably the strong fibrous materials of the silica family, such as Refrasil silica fibers above-mentioned for the insulative layer. Other materials include asbestos embedded in resins (thermosetting) and glass fiber. Resins suitable for bonding are the phenolics and silicons.

In the chamber section liner 11 the layers or laminates 15a and 15b are positioned substantially as shown and bonded together. Bonding is best achieved by use of curing type plastic resins, and for the layers in the chamber section use of epoxy novalac permits an excellant bond to be obtained, while at the same time a medium for the dispersal of Microballoon miniature spheres is provided. Other materials suitable for use in like manner are any of the thermosetting resins, examples of which are urea formaldehyde, phenol formaldehyde, melamine formaldehyde and epoxy formaldehyde. These resins also permit bonding of the liner to the outer shell which, as above stated, can be metallic, although other non-metal or plastic materials, for example glass fibers can be used. This is achieved by using the cloth or tape form of the glass fibers and wrapping them around liner 15 to any desired thickness.

After fashioning all the layers together and properly curing the resinous materials (and thereby achieving the bond therebetween) the integral motor body thus obtained can be coated with glass fiber or wrapped therewith. In the event that the outer casing is metallic it is only necessary for the purposes herein to position the layers and resins uncured therein and by heating effect proper cure thereby achieving a complete rocket motor unit. By this means and proper selection of resins and conductive materials, a lightweight, high temperature and high pressure resistant article is obtained capable of use in all instances where hot gas flow control is desired.

As a final step in the manufacture of motor 10 throat insert 18, usually made of one of the so-called "non-eroding" materials such as tungsten, molybdenum or alloys thereof, is fitted to liner 13 at throat 17 by press fit or adhesive bonding, either at time of cure or thereafter. Finally all interior liner portions are smoothed of excess material by machining, grinding or abrasives to achieve a smooth, contoured passage for minimum flow velocity loss of the high temperature gases exiting from the motor.

Having described the invention and its purpose it is to be understood that many various embodiments of the inventive concept can be used and still remain within the scope and spirit thereof. Therefore, the invention and its usefulness is to be limited only as defined by the subtended claims.

What is claimed is:

1. A rocket motor construction of the uncooled type comprising a substantially rigid outer shell defining a combustion chamber and converging-diverging nozzle surrounding corresponding, noncontiguous liner portions, said liner portions bonded to the inner surface of said shell to form a combustion chamber liner section, a converging liner section and a diverging liner section, said liner portion in said combustion chamber section comprising a plurality of alternately arranged, integrally united, layers of heat conductive and heat insulative materials, said layers arranged parallel to a central axis, said heat insulating layers being identical and each comprising a resin impregnated base of heat insulative fiber, said heat conducting layers being identical and each comprising an open mesh metallic screen, said liner portion in said converging section comprising a plurality of alternately arranged, integrally united, layers of heat conducting and heat insulating layers, said layers arranged in a nest of conic frustrums having their edges angularly disposed with respect to a central motor axis, said insulating layers being identical and each comprising fibrous silica impregnated with a thermosetting resin, each said conducting layer being identical and each comprising an open mesh metallic screen, said liner portion in said diverging section comprising a plurality of alternatively arranged, integrally united, layers of heat insulating and heat conducting material, said insulating layers being identical and each comprising fibrous silica impregnated with a thermosetting resin, each said heat conducting layer being identical and each comprising a woven cloth of graphite threads, said thermosetting resins curable throughout each of said liner portions upon heating to effect bonding between each of said layers, and an erosion resistant, metallic throat insert disposed in said converging-diverging nozzle.

2. The motor of claim 1 wherein the metal for the metallic screen in said liner portion in said combustion chamber section is selected from the group consisting of copper, steel, aluminum and nickel.

3. The motor of claim 1 wherein the insulative fiber in said base in each of said insulative layers in said chamber liner portion is asbestos.

4. The motor of claim 1 wherein the insulative fiber in said base in each of said insulative layers in said chamber liner portion is glass.

5. The motor of claim 1 wherein the insulative layer impregnating resin is a liquid epoxy novolac.

6. The motor of claim 1 wherein the metal for the metallic screen in said liner portion in said converging section is selected from the group consisting of tungsten and molybdenum.

(References on following page)

References Cited by the Examiner

UNITED STATES PATENTS

| | | | |
|---|---|---|---|
| 2,658,332 | 11/1953 | Nicholson | 60—35.6 |
| 2,744,043 | 5/1956 | Ramberg | 60—35.6 |
| 2,806,509 | 9/1957 | Bozzacco et al. | 260—2.5 |
| 2,835,107 | 5/1958 | Ward | 60—35.6 |
| 2,848,133 | 8/1958 | Ramberg | 60—35.6 |
| 2,849,860 | 9/1958 | Lowe | 60—35.6 |
| 2,924,537 | 2/1960 | Wallis et al. | 60—35.6 |
| 2,987,880 | 6/1961 | Kimmel | 60—35.6 |
| 2,995,011 | 8/1961 | Kimmel | 60—35.6 |
| 3,001,362 | 9/1961 | Runton | 60—35.6 |
| 3,044,256 | 7/1962 | Bayly et al. | 60—35.6 |
| 3,048,972 | 8/1962 | Barlow | 60—35.6 |
| 3,070,957 | 1/1963 | McCorkle | 60—35.6 |
| 3,073,111 | 1/1963 | Hasbrouck | 60—35.6 |
| 3,074,585 | 1/1963 | Koontz | 60—35.6 |
| 3,081,705 | 3/1963 | Warnken | 60—35.6 |
| 3,115,746 | 12/1963 | Hsia | 60—35.6 |
| 3,142,960 | 8/1964 | Bluck | 60—35.6 |

OTHER REFERENCES

Astrolite: H. I. Thompson Fiber Glass Co. Products Bulletin, No. PB 7–24A, July 1, 1959, pages 1–6.

MARK NEWMAN, *Primary Examiner.*

ABRAM BLUM, SAMUEL LEVINE, *Examiners.*

C. R. CROYLE, D. HART, *Assistant Examiners.*